US006535929B1

United States Patent
Provino et al.

(10) Patent No.: US 6,535,929 B1
(45) Date of Patent: Mar. 18, 2003

(54) UNIVERSAL COMMUNICATION MECHANISM FOR APPLICATIONS RUNNING IN A MULTITASKING ENVIRONMENT

(75) Inventors: Joseph E. Provino, Cambridge, MA (US); James D. Davis, Pepperell, MA (US); Marc S. Dye, Camarillo, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/672,528

(22) Filed: Jul. 2, 1996

(51) Int. Cl.[7] .............................. G06F 13/10; G06F 9/46
(52) U.S. Cl. ........................................ 709/321; 709/313
(58) Field of Search .................................. 395/681, 677, 395/500; 711/202; 709/321, 313, 107

(56) References Cited

U.S. PATENT DOCUMENTS

| | | | |
|---|---|---|---|
| 5,175,855 A | * 12/1992 | Putnam et al. | 395/700 |
| 5,327,558 A | * 7/1994 | Burke et al. | 395/650 |
| 5,414,848 A | * 5/1995 | Sandage et al. | 395/650 |
| 5,428,781 A | * 6/1995 | Duault et al. | 395/650 |
| 5,459,869 A | * 10/1995 | Spilo | 395/700 |
| 5,604,885 A | * 2/1997 | Denio | 395/500 |
| 5,638,517 A | * 6/1997 | Bartek et al. | 395/200.18 |
| 5,784,615 A | * 7/1998 | Lipe et al. | 395/681 |

FOREIGN PATENT DOCUMENTS

| | | |
|---|---|---|
| EP | 0 366 583 | 2/1990 |
| WO | WO 94/15293 | 7/1994 |

OTHER PUBLICATIONS

J. L. Conger, Windows API Bible, Waite Group Press, chapter 8 Mar. 15, 1992.*
T. W. Olsen, "Making Windows and DOS programs Talk", Windows–DOS Developer's Journal, vol. 3, No. 5, p21(14), May 0, 1992.*
A. Shmidt, "RINGO: VxD on the Fly", Dr. Dobb's Journal, vol. 19, No. 3, p 133(7), Mar. 0, 1994.*
M. Pietrek, Windows Internals, Addison–Wesley Publishing Company, chapter 7, 1993.*
John Gosch, "Merging Real–Time Processing and Unix V", *Electronics*, Sep. 1990, pp. 62–63.

* cited by examiner

Primary Examiner—Sue Lao
(74) Attorney, Agent, or Firm—Harness, Dickey & Pierce, P.L.C.

(57) ABSTRACT

Communication between application programs is facilitated by a virtual device driver to which the application programs make function calls. The device driver registers each application in response to a request for application-to-application communication. During registration, the device driver determines the addressing mode of the application being registered. An address mapping operation is performed and the results of the mapping operation along with other information about the application are stored in a data store administered by the kernel of the device driver. The device driver allows two applications of dissimilar addressing mode to communicate with one another without a priori knowledge of the communicating partner's addressing mode. The virtual device driver handles communication transparently for the communicating applications, allowing the applications to send and receive data.

45 Claims, 8 Drawing Sheets

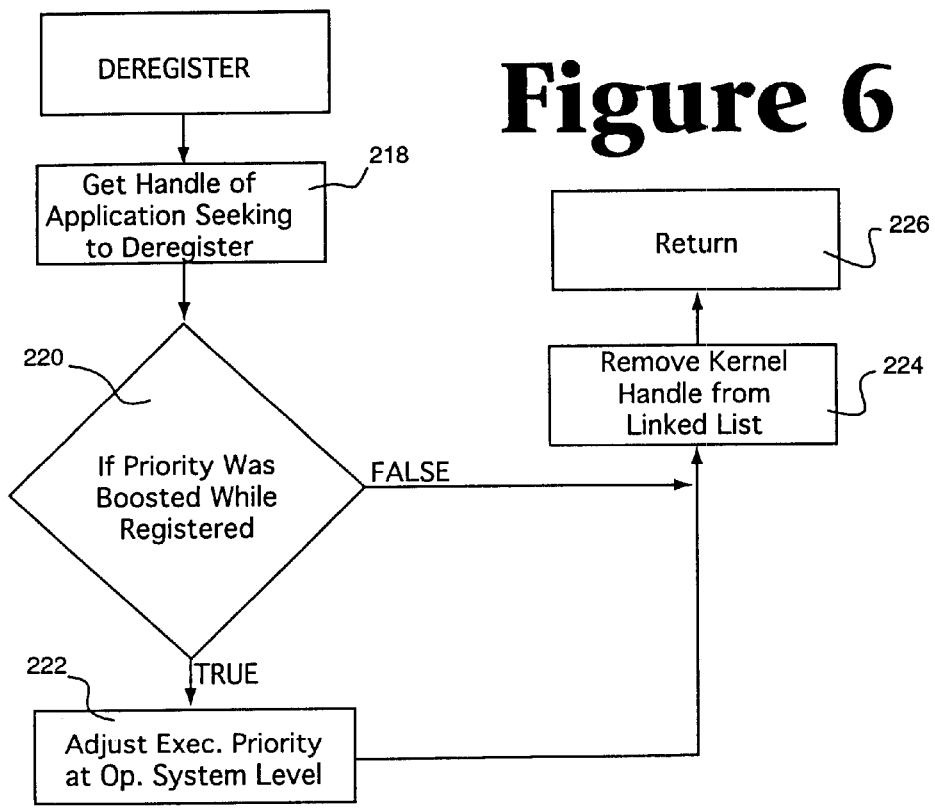
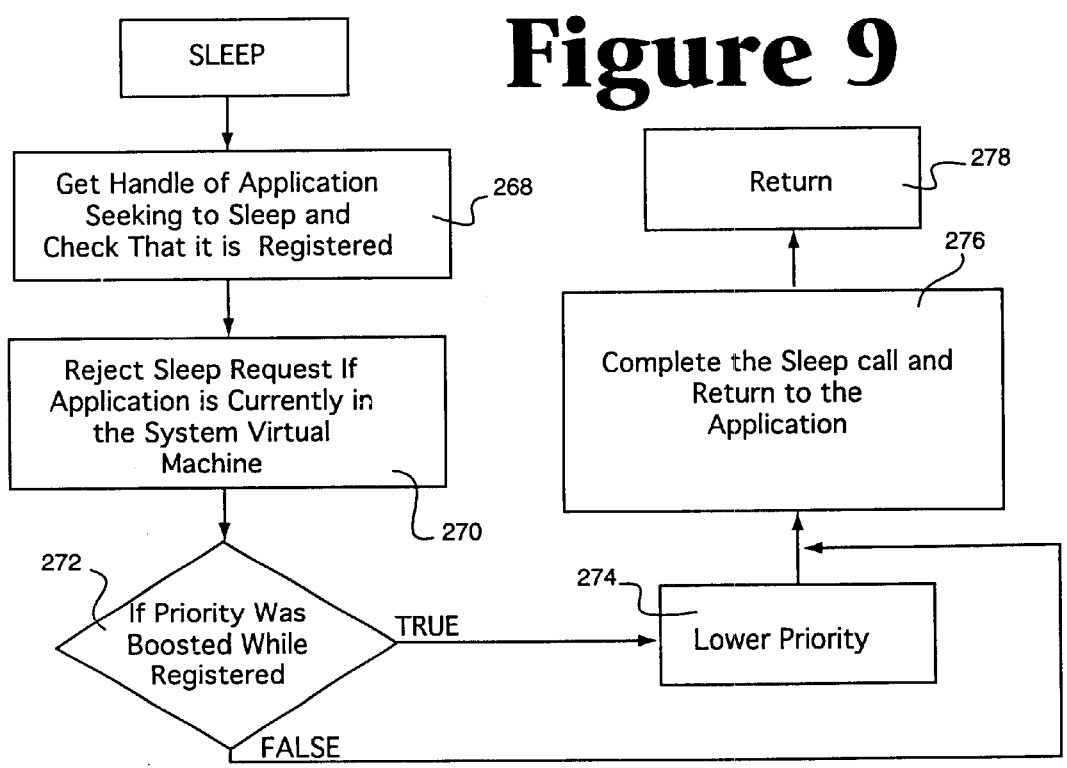

UNIVERSAL COMMUNICATION MECHANISM FOR APPLICATIONS RUNNING IN A MULTITASKING ENVIRONMENT

BACKGROUND OF THE INVENTION

The present invention relates generally to communication between application programs in a multitasking environment such as the MICROSOFT WINDOWS operating system environment. ("MICROSOFT" and "WINDOWS" are registered trademarks of Microsoft Corporation). More particularly, the invention relates to a universal communication mechanism that allows computer-implemented applications of potentially dissimilar memory addressing modes to share information with one another in a convenient fashion, and without requiring each application to know the addressing mode of the other in order to share information such as messages and data. In its presently preferred form, the invention is implemented as a WINDOWS virtual device driver (VxD) that applications can access through standard API function calls to effect the desired inter-application communication transparently.

For largely historic reasons the MICROSOFT WINDOWS operating system supports several different addressing modes. On a machine based around the Intel 80386 processor with at least 8 megabytes of memory, WINDOWS 3.x (WINDOWS 3.1 and WINDOWS For Workgroups) runs in the '386 enhanced mode. In the enhanced mode the WINDOWS operating system can support both 16 bit and 32 bit WINDOWS applications and DOS applications. The DOS applications run in the "virtual-86" mode of the microprocessor. Before the advent of the WINDOWS 3.x operating system, most application programs for the IBM-PC and PC compatibles were DOS programs that were, by design, constrained to operate within a 640K memory space. The virtual-86 mode of the '386 processor can simultaneously mimic one or more virtual DOS machines, ILO allowing one or more DOS applications to load concurrently and independently of one another. The virtual-86 mode permits each DOS application to have its own memory space, which appears to the DOS application as if it has the entire use of a conventional DOS machine. With the advent of the WINDOWS 95 operating system, a 32 bit memory mode has been added to the palette of addressing mode choices that a program may have.

The available addressing modes (virtual-86 mode, WINDOWS 16 bit mode, and WINDOWS 32 bit mode) are fundamentally incompatible with one another. The virtual-86 mode is based on the standard segmented memory architecture of the INTEL microprocessor family. (INTEL is a registered trademark of Intel Corporation.) A 20 bit address is calculated by a particular merging of two 16 bit values, a segment value and an offset value. Through this addressing mode, an application program can access a 1 megabyte memory space. Its combination with the offset value results in a 20 bit address.

The WINDOWS 16 bit addressing mode differs from the virtual-86 mode in several respects. First, although two separate values are used to generate a linear address, the segment value (called the "selector" value in this mode) does not represent a linear memory address. Rather, it represents an offset into a "descriptor table" that provides a 32 bit base address in linear memory. The offset address is then added to the base address to generate a 32 bit address. In this way, the WINDOWS 16 bit addressing mode can access up to 16 megabytes of linear (virtual) memory.

The WINDOWS 32 bit addressing mode is different still. The 32 bit address is simply the flat concatenation of two 16 bit words producing a 32 bit linear address.

As software tasks become more complex, multitasking software solutions become more and more attractive. There are many software tasks that could be advantageously solved by allocating different aspects of the task to different concurrently running applications that are each specially configured to handle a portion of the task. In the present MICROSOFT WINDOWS environment such division of labor would conventionally be accomplished by multiple applications of the same addressing mode. Being of the same addressing mode allows the multiple WINDOWS applications to share information with one another by directly accessing the memory space of the other. However, DOS applications (virtual-86) each have their own address space and thus cannot share information by directly accessing the memory space of the other.

It has not been heretofore convenient for multiple applications of different addressing modes to communicate with one another in this fashion. For applications of different memory addressing modes to communicate directly with one another it has been heretofore necessary to specifically configure the applications to be able to determine the addressing mode of its communicating partner in order to address the memory of that partner using the correct addressing mode. This would, for example, require existing application programs to be extensively rewritten or modified before they can support communication with other application programs.

SUMMARY OF THE INVENTION

The present invention provides a universal communication mechanism that allows application programs of different memory addressing modes to communicate with one another, even if they do not know the addressing mode of the other. More specifically, the invention provides a communication mechanism for passing information within an operating system environment between computer-implemented applications running in the environment that employ different memory addressing modes. The communication mechanism comprises a device driver that is coupled to the operating system environment and that provides an application program interface for communicating with the applications through a set of predefined function calls. The device driver has a message handler that is responsive to these function calls. The device driver includes a message buffer for establishing buffered communication between the s ending application and the receiving application. A mapping mechanism determines the addressing mode of the sending application and translates the addressing mode of th e sending application into a predefined addressing mode. This mapping mechanism is used by a message transfer mechanism that copies the message from the sending application into the message buffer. The message transfer mechanism then signals the receiving application to ask the driver to copy the message being communicated to the receiving application's buffer. In this way a copy of the message being communicated is passed from sending application to receiving application without requiring the receiving application to know the addressing mode of the sending application.

For a more complete understanding of the invention, its objects and advantages, refer to the following specification and to the accompanying drawings.

BRIEF DESCRIPTION OF THE DRAWINGS

FIG. 6 is a flowchart of the Deregister routine;

FIG. 9 is a flowchart diagram of the Sleep routine.

DESCRIPTION OF THE PREFERRED EMBODIMENT

Figure 1:
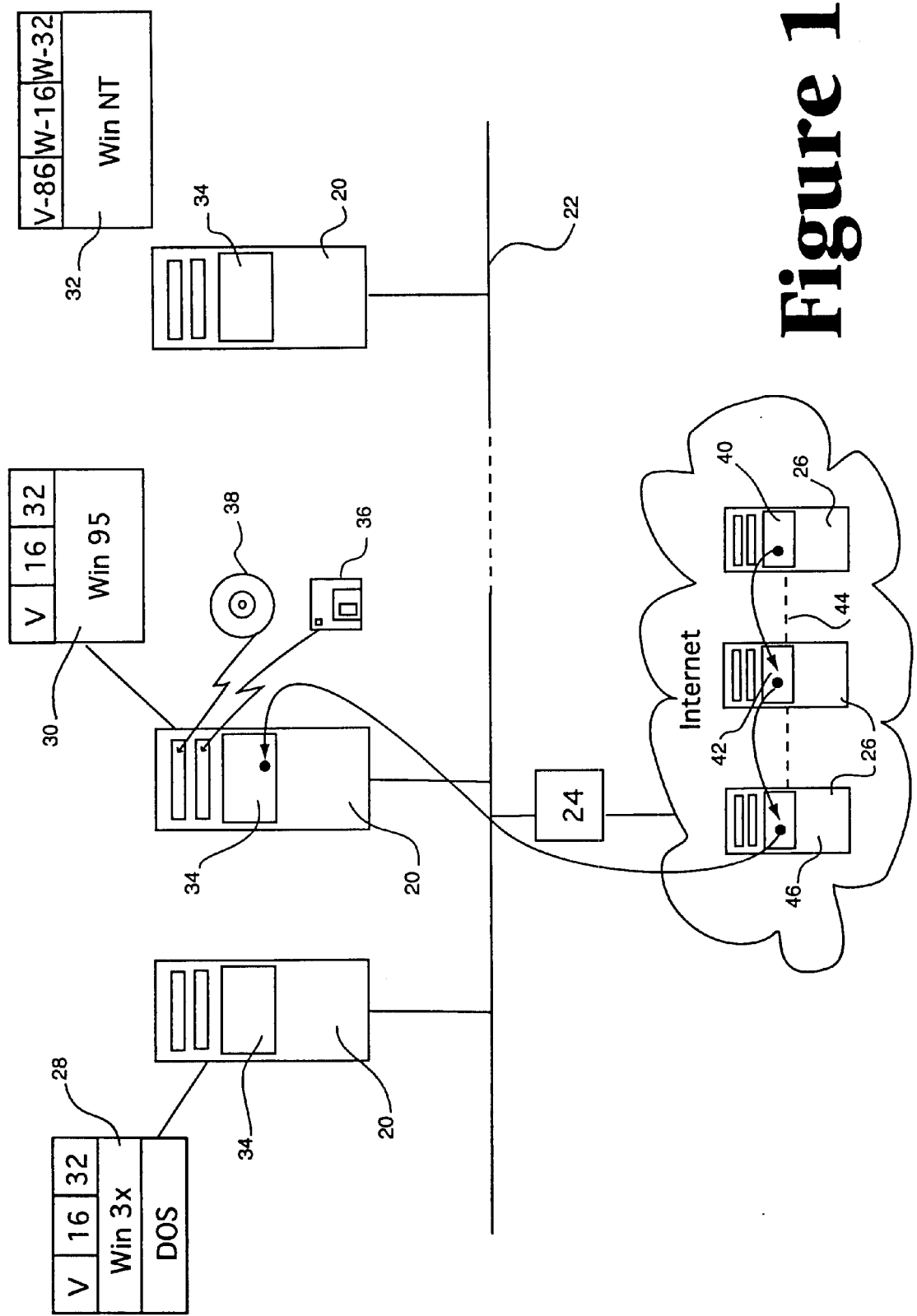
FIG. 1 is an exemplary system block diagram of the computer environment in which the invention may be implemented.

FIG. 1 illustrates an exemplary computer system in which the universal communication mechanism of the invention may be employed. Specifically, FIG. 1 shows a collection of individual computers 20 that may be connected to a local area network or LAN 22. For illustration purposes, the local area network is coupled through a suitable Internet server device 24 to a plurality of remote computers 26 forming part of the Internet or enterprise wide area network. It should be emphasized that the exemplary system presented here is simply intended to show one possible hardware architecture to support the invention. In its most elemental form, the invention can be implemented on a single standalone computer, such as any one of computers 20 without its connection to the LAN 22. Other computer system topologies are also possible within the scope of the invention.

The presently preferred embodiment of the universal communication mechanism is configured to work with the MICROSOFT WINDOWS operating system. The invention will thus be explained in this context, although the principles of the invention may be utilized in other operating systems, including future variations, extensions and replacements of and for the current WINDOWS operating systems. Therefore, for illustration purposes, FIG. 1 depicts three variants of the WINDOWS operating system, namely WINDOWS 3X (depicted at 28), WINDOWS 95 (depicted at 30) and WINDOWS NT (depicted at 32). The WINDOWS 3X operating system runs on top of the MS-DOS operating system, as illustrated.

As will be described below, the universal communication mechanism permits information to be passed, within the operating system environment, between computer-implemented applications running in the environment. Specifically, the universal communication mechanism allows these applications to pass information even though the applications themselves employ different memory addressing modes. For purposes of explaining the invention in its presently preferred form, three different addressing modes will be illustrated: the virtual-86 or DOS addressing mode, the WINDOWS 16 bit addressing mode and the WINDOWS 32 bit addressing mode. Thus in FIG. 1, each computer 20 runs multiple application programs (one of each is illustrated and designated V-86, W-16 and W-32), respectively. Again, it should be emphasized that the universal communication mechanism can be deployed on one computer or multiple computers and that the number of application programs and addressing mode of those programs is not limited to what has been illustrated here.

The universal communication mechanism is preferably implemented as a virtual device driver (V×D) that conforms to standard MICROSOFT WINDOWS programming practices. For details, refer to the Microsoft Device Driver Kit and the Microsoft Developer's Network, both available from Microsoft Corporation, Redmond, Wash. As will be more fully illustrated, the virtual device driver is installed preferably on the hard disk 34 of computer 20 so that it couples to the operating system as a virtual device driver. Application programs running in the operating system environment may access this virtual device driver to utilize its universal communication mechanism services. Because the universal communication mechanism is implemented as a virtual device driver, the application programs may access it without themselves requiring extensive program modification. The only modification would be to make the appropriate function calls to the virtual device driver.

There are numerous ways to package and deliver the universal communication mechanism for deployment in a computer or computer system. FIG. 1 illustrates three ways. The universal communication mechanism may be supplied on a floppy disk 36, CD-ROM 38 or other suitable data storage medium. These two media have been illustrated because they are currently the most popular modes of software delivery. There will undoubtedly be others in the future. In addition to delivery by a physically transportable memory device, the universal communication mechanism can also be delivered electronically. This has been illustrated diagrammatically in FIG. 1 as follows. The communication mechanism may be stored on hard disk 40 and then transferred through a suitable file transfer protocol to hard disk 42 over a communication link 44. From hard disk 42 the universal communication mechanism may be transferred to hard disk 46 and sent through device 24 to hard disk 34. Once transferred from a source hard disk to a destination hard disk the copy on the source hard disk may be erased, if desired.

Figure 2:
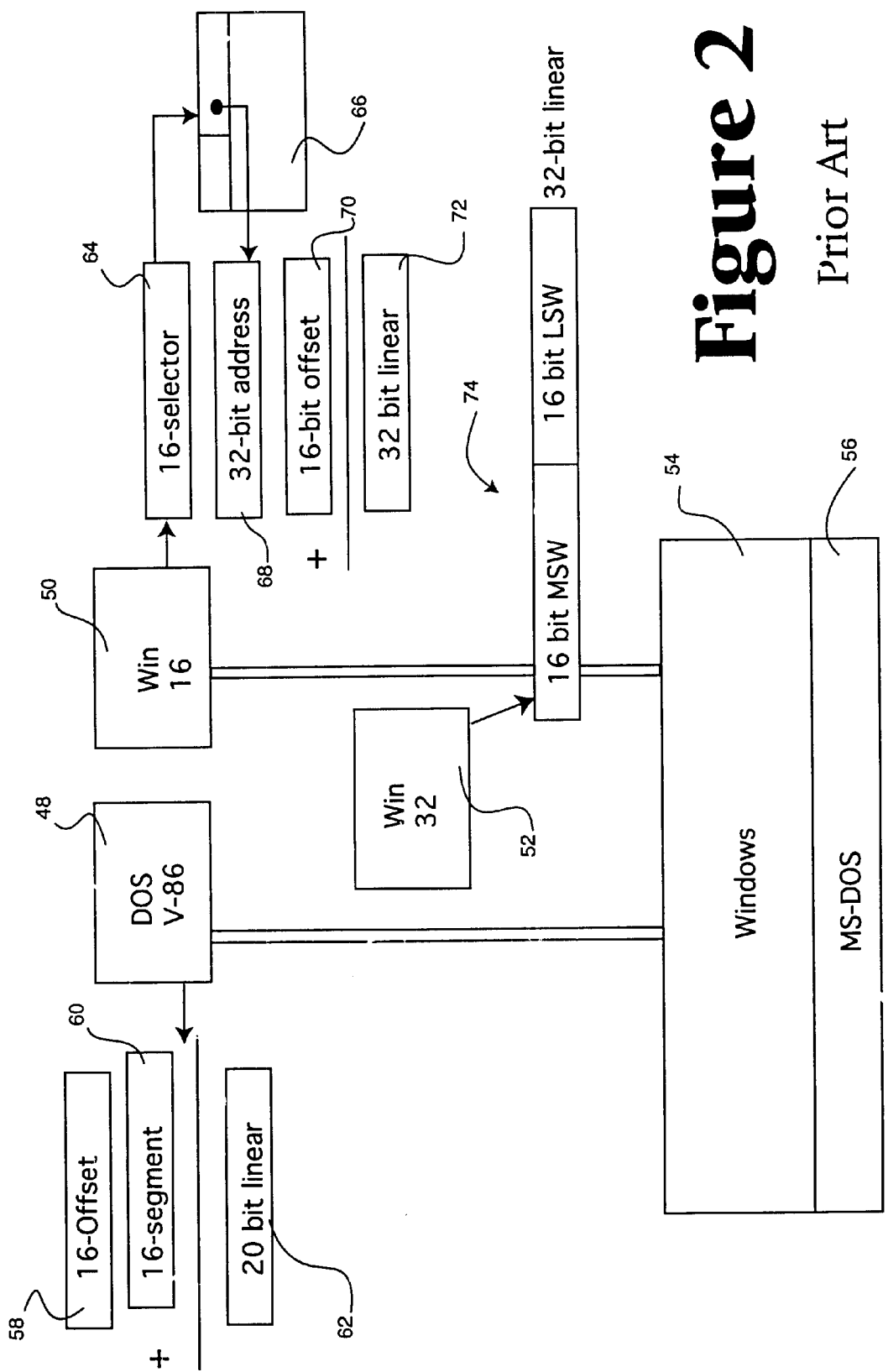
FIG. 2 is a block diagram illustrating the memory addressing modes of three different application programs, useful in understanding the difficulties in direct application-to-application communication where memory addressing modes are different.

Before presenting a more detailed explanation of the universal communication mechanism, a review of conventional WINDOWS addressing modes may be helpful. Refer to FIG. 2, which illustrates three application programs running in the WINDOWS operating system environment. Specifically, FIG. 2 illustrates a DOS application 48 running in the virtual-86 addressing mode, a 16 bit WINDOWS application 50 and a 32 bit WINDOWS application 52. For illustration purposes here, the WINDOWS operating system 54 is shown running on top of and in conjunction with the MS-DOS operating system 56. As previously discussed, more recent variants of the WINDOWS operating system (e.g. WINDOWS 95 and WINDOWS NT) dispense with the need for a separate MS-DOS operating system layer.

As shown in FIG. 2, DOS application 48 uses a 20 bit address to access memory. The 20 bit address is calculated by combining a 16 bit offset address 58 and a 16 bit segment address 60 to arrive at the 20 bit linear address 62. The 20 bit address is obtained by shifting the segment address 4 places to left and then summing it with the offset address.

In contrast to the DOS application, the 16 bit WINDOWS application 50 uses a 32 bit linear address that is determined as follows. A 16 bit selector address 64 is used to access a descriptor table 66. The descriptor table is a lookup table from which a 32 bit base address 68 is obtained. To this base address the 16 bit offset 70 is added to arrive at the 32 bit linear address 72.

In contrast to either of the preceding addressing modes, the 32 bit WINDOWS application 52 employs a flat 32 bit linear address 74 that may be considered as consisting of a 16 bit most significant word MSW and a 16 bit least significant word LSW.

Passing memory between applications 48, 50 and 52 is significantly complicated by the fact that these three applications use entirely different addressing modes. Between two applications of the same addressing mode it is relatively straightforward to pass information (subject to any restrictions due to protection) by simply copying it from source to destination, or by passing a pointer to allow one application to access the other application's data memory. However, with applications employing different addressing modes, this simple exchange of information cannot take place unless the effects of these different addressing modes has been taken into account. The conventional way to do this is to write or modify the application programs to (a) determine the addressing mode of its communicating partner and (b) make appropriate translations so the data are not corrupted. Practically speaking, this means that all application programs must be specifically written (or modified to include) this communication capability). This is not practical, given the plethora of current application programs.

The universal communication mechanism of the invention solves the problem through a virtual device driver with which the application programs communicate using standard application program interface (API) function calls to the virtual device driver. Illustrated in FIG. 3, the device driver 76 couples to the WINDOWS operating system 54, making the device driver accessible to the application programs 48, 50 and 52 through the standard WINDOWS API protocol. The device driver has an application program interface module 78 that allows the application programs to invoke several functions useful in effecting application-to-application communication. These functions comprise:

REGISTER to identify an application that wants to receive data;

DEREGISTER to close the communication channel when application-to-application communication is finished;

SEND to send a message or other information to a specified registered application;

RECEIVE to read a message or copy information to the receiving application; and

SLEEP to block an application while waiting for information to be sent to it.

The device driver 76 has a message handler module 80 that actually performs the functions requested by the applications through the application program interface 78. The message handler includes a mapping mechanism 82 that is configured to determine the addressing mode of the sending application and to translate that addressing mode into a flat address comparable to the flat address of the 32 bit WINDOWS application. The mapping mechanism is able to determine the addressing mode of the sending application by interpreting existing WINDOWS operating system parameters; the sending application does not need to be specially programmed or modified to provide this information.

The actual application-to-application communication is handled through a message buffer comprising part of a data store 84 that is administered by the device driver. Each time an application registers to initiate application-to-application communication (through the register function call) a message buffer for the requested communication is instantiated as part of a data structure used to store other pertinent information about the requested communication. The message handler 80 includes a transfer mechanism 86 that extracts the required transfer information from the application program that invoked the function call. This information is stored in the data store of which the message buffer is a part. The transfer mechanism 86 uses the mapping mechanism 82 to record, for later use, the addressing mode of each application as it registers (via the REGISTER function call). After extracting the necessary information from the sending application and storing it in data store 84, the transfer mechanism then signals the receiving application so that it may (through a RECEIVE function call) ask the virtual device driver to access the message buffer to copy the information for its own use.

Figure 3:
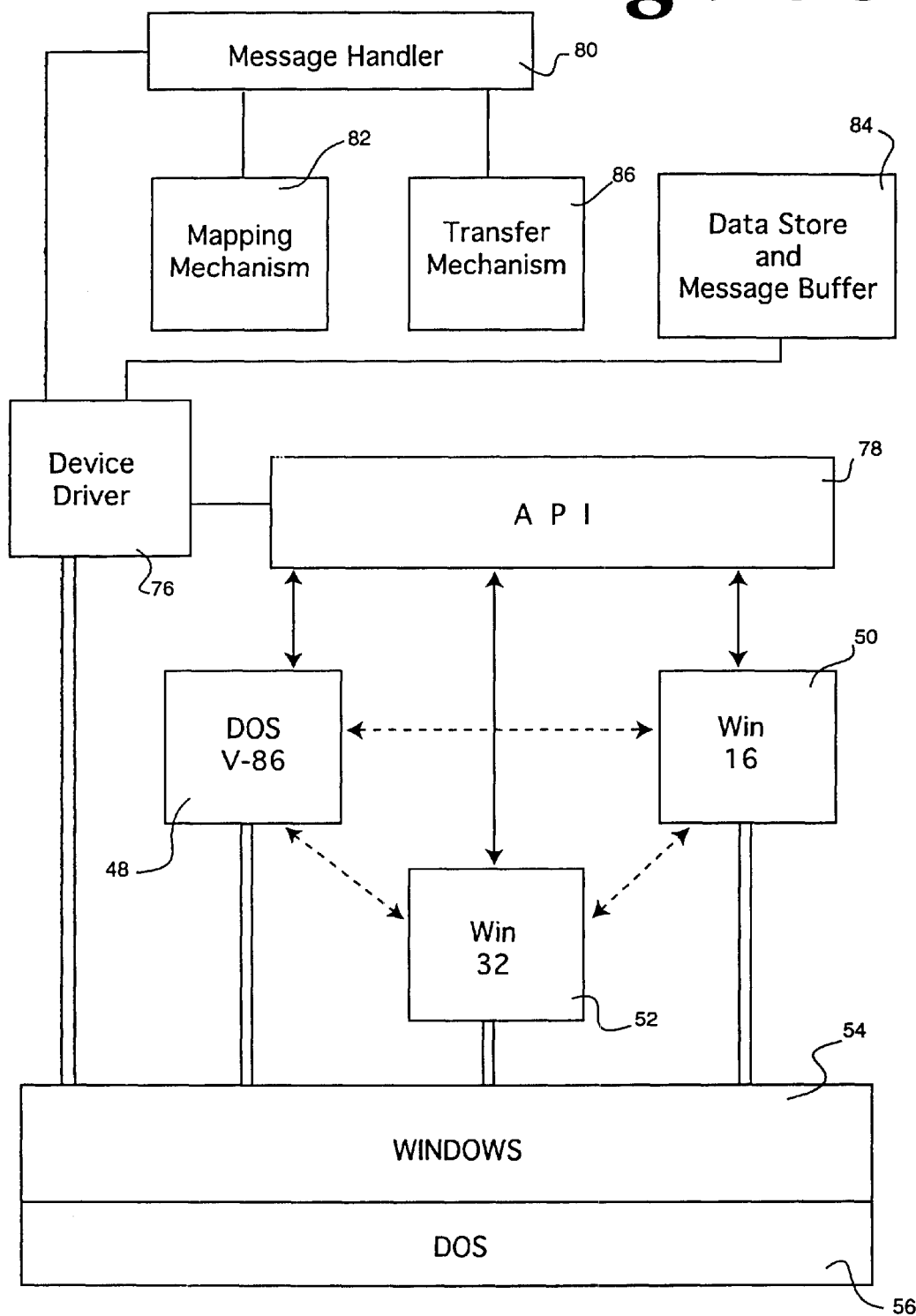
FIG. 3 is a subsystem block diagram of the universal communication mechanism that gives an overview of the major components of the communication mechanism according to the presently preferred embodiment.
Figure 4:
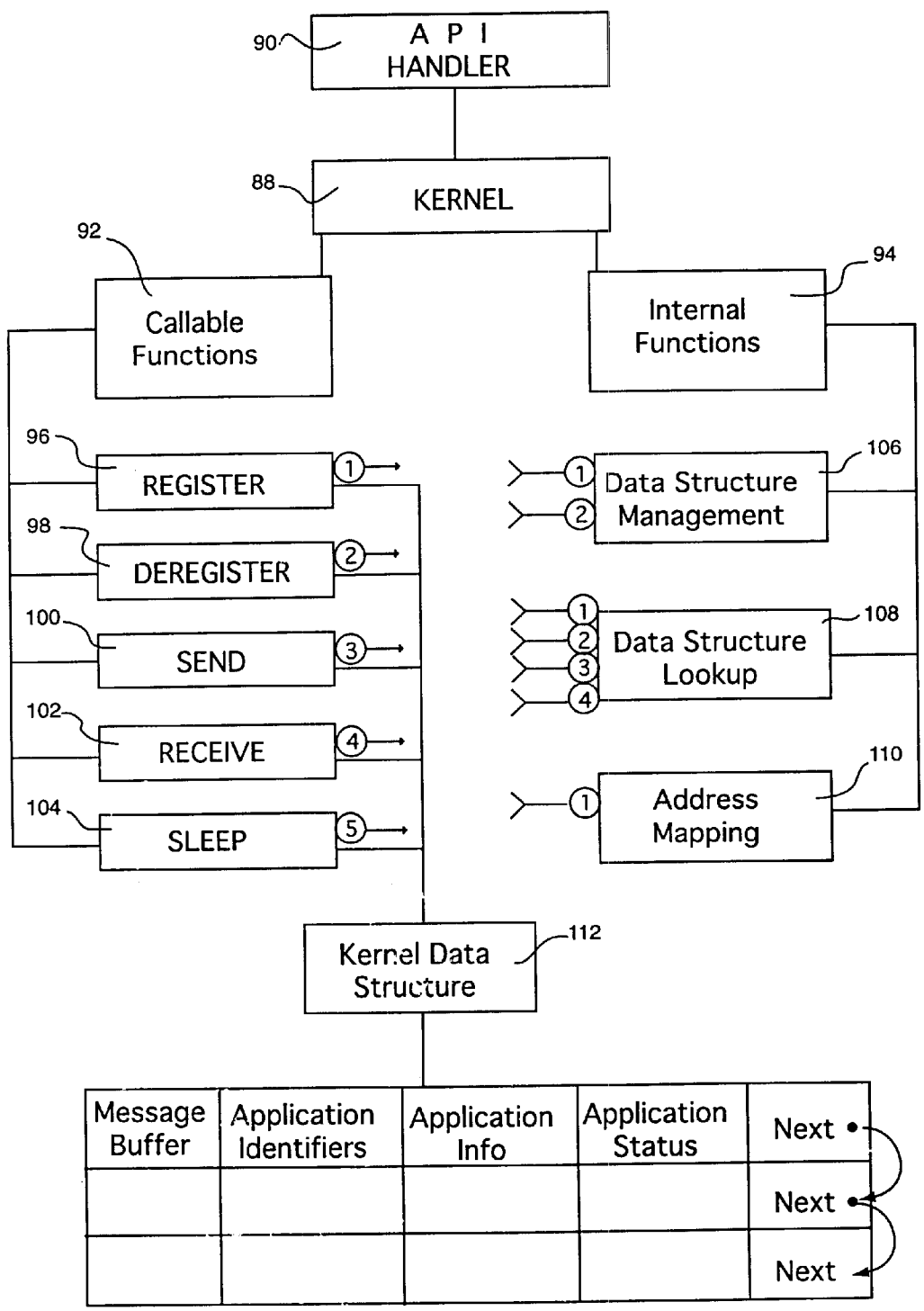
FIG. 4 is a detailed block diagram of the universal communication mechanism of FIG. 3.

The preferred embodiment of the universal communication mechanism will now be described with reference to FIG. 4. FIG. 4 illustrates the presently preferred software configuration as a virtual device driver. FIG. 4 s hows the hierarchical relationships among the various subsystems of the preferred embodiment. FIG. 4 illustrates the software components that make up the functional components illustrates in FIG. 3.

Referring to FIG. 4, a major portion of the universal communication mechanism is implemented as the kernel module 88. Kernel module 88 interfaces with the API handler module 90. The API handler module defines the API interface 78 (FIG. 3) and establishes standard WINDOWS device driver interfacing with the application programs. Kernel module 88 provides the remaining functions of the universal communication mechanism, including management of the data store and message buffer 84 (FIG. 3). The Kernel module may be hierarchically subdivided into a group of callable functions, represented by block 92, and internal functions, represented by block 94. The callable functions comprise those that an application program may request through the API interface. These include the REGISTER function 96, the DEREGISTER function 98, the SEND function 100, the RECEIVE function 102 and the SLEEP function 104. Flowcharts of these callable functions are presented in the drawings and will be discussed below.

The internal functions comprise various support functions that are called or utilized by the callable functions. For purposes of illustration, these functions have been categorized as data structure management functions 106, data structure lookup functions 108 and address mapping functions 110. The kernel module maintains the data store and message buffer 84 (FIG. 3). The kernel module software defines a kernel data structure 112 in the form a C language struct comprising a number of different elements. The presently preferred data structure is shown in the Appendix.

The data structure management functions 106 are responsible for creating instances of the kernel data structure when an application registers (by invoking the REGISTER function) and when the application deregisters (by invoking the DEREGISTER function). The data structure management functions also maintain and update information in the data store during operation of the universal communication mechanism. In FIG. 4 REGISTER function 96 and DEREGISTER function 98 have been provided with circled numerals 1 and 2, respectively, with like circled numbers on the data structure management functions 106. This indicates that the register and deregister functions call upon the data structure management functions during operation. A similar notation has been used throughout FIG. 4.

The data structure lookup functions 108 are accessed by each of the callable functions (except for the SLEEP function) to access data in the data store. The data lookup functions provide services to lookup a registered application by its ASCII name or by its virtual memory handle. Such lookup operations are performed during routine operation of the universal communication mechanism.

The address mapping functions 110 are called by register function 96 each time an application seeks to register (by invoking the REGISTER command). The address mapping functions 110 provide the functionality of the mapping mechanism 82 (FIG. 3).

With the foregoing overview of the universal communication mechanism architecture in mind, a description of the callable functions will now be presented with reference to the flowchart diagrams of FIGS. 5–9.

Figure 5:
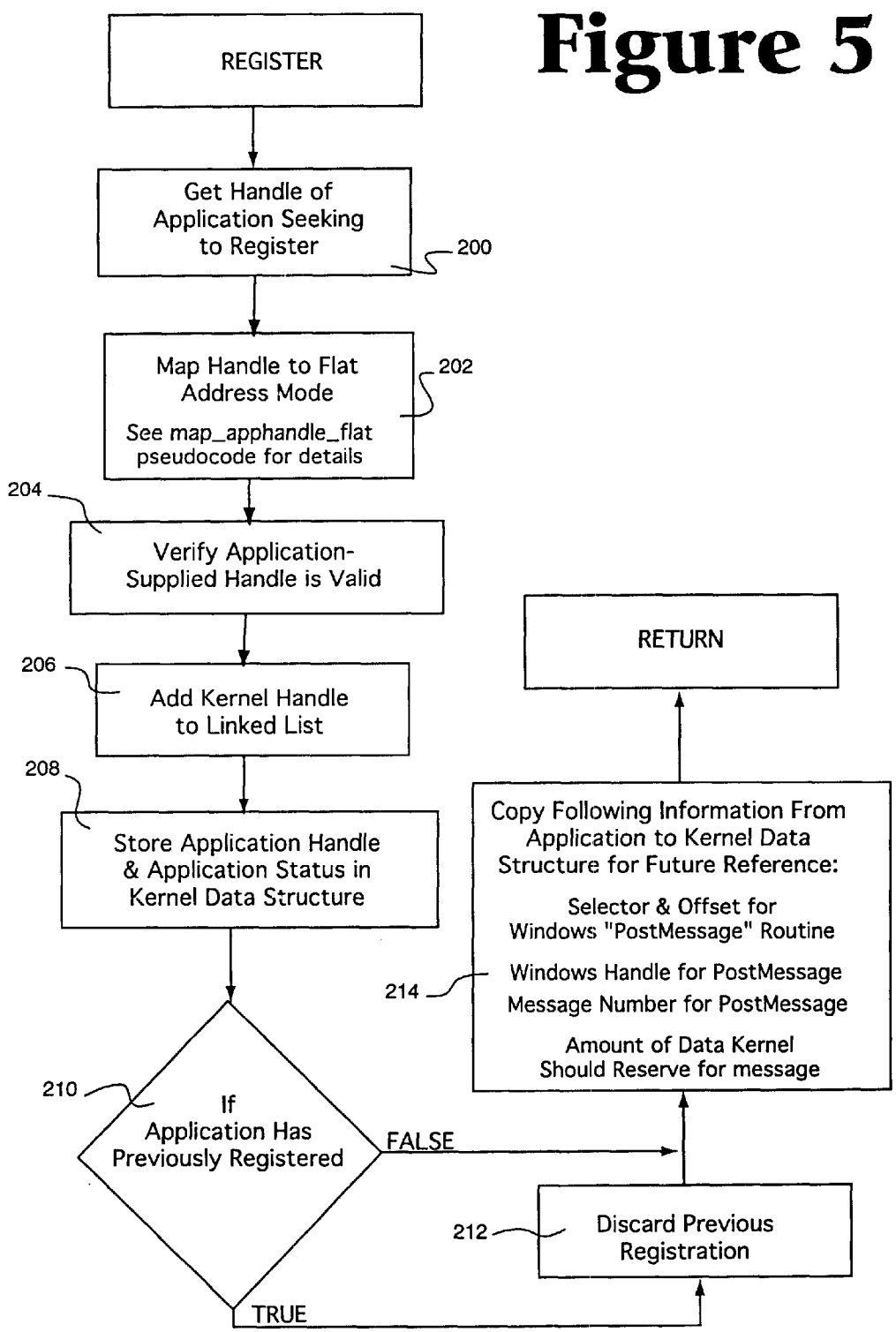
FIG. 5 is a flowchart diagram of the Register routine.

FIG. 5 illustrates the internal operation of the REGISTER function 96. Referring to FIG. 5, the REGISTER routine begins (Step 200) by acquiring the handle of the application seeking to register. Next, the handle is mapped to a flat address mode (Step 202). This is done to compensate for the fact that different applications may employ different addressing modes that are not directly compatible with one another. The details of the address mapping procedure are shown in the pseudocode listing entitled "Map Flat." After mapping the application handle, the routine proceeds to verify that the handle supplied by the application is a valid one (Step 204). If not valid, an error message is generated and the routine terminates.

Once the handle has been mapped and verified, the routine generates an instance of the kernel data structure 112 (FIG. 4) to represent the application seeking to register. A handle to this newly added data element is added to the linked list maintained as part of the kernel data structure (Step 206). After allocating space for the new data element, the application handle and application status are stored in the newly created data element (Step 208). It is possible that an application seeking to register may have previously registered through a previous call to the register function 96. The register function tests for this at step 210 and discards the previous registration at step 212 if a previous registration is found. In this way, the kernel data structure is maintained current.

In addition to storing the application handle and application status, the register function also makes a copy of additional application information that is needed to post a communication message to the intended recipient. This is performed at step 214. Specifically, the routine stores the selector and offset address values needed to perform the WINDOWS "PostMessage" routine, as well as the WINDOWS handle for "PostMessage" routine and the message number for that routine. The amount of data the kernel should reserve for messages is also stored at this time.

Having allocated storage space according to the kernel data structure and having stored the appropriate information needed to effect application-to-application communication, the REGISTER routine ends at Step 216.

The DEREGISTER routine, shown in FIG. 6 decommissions a previously effected registration. The DEREGISTER command ensures that all housekeeping functions are performed and that the kernel data structure instance generated by the registration command are removed from the linked list data structure. Thus, in Step 218, the application handle of the application seeking to deregister is acquired. If the priority of the application was boosted through some operature during the time the application was registered, this is detected at Step 220. If the priority was boosted while registered, the execution priority is adjusted at Step 222, to place the application in the state it had been prior to registration. Then the kernel handle is removed from the linked list (Step 224) and the routine returns at Step 226. Removing the kernel handle from the linked list, in effect, decommissions the registration of the application so that the records maintained through registration are no longer accessible for update or searching.

Figure 7:
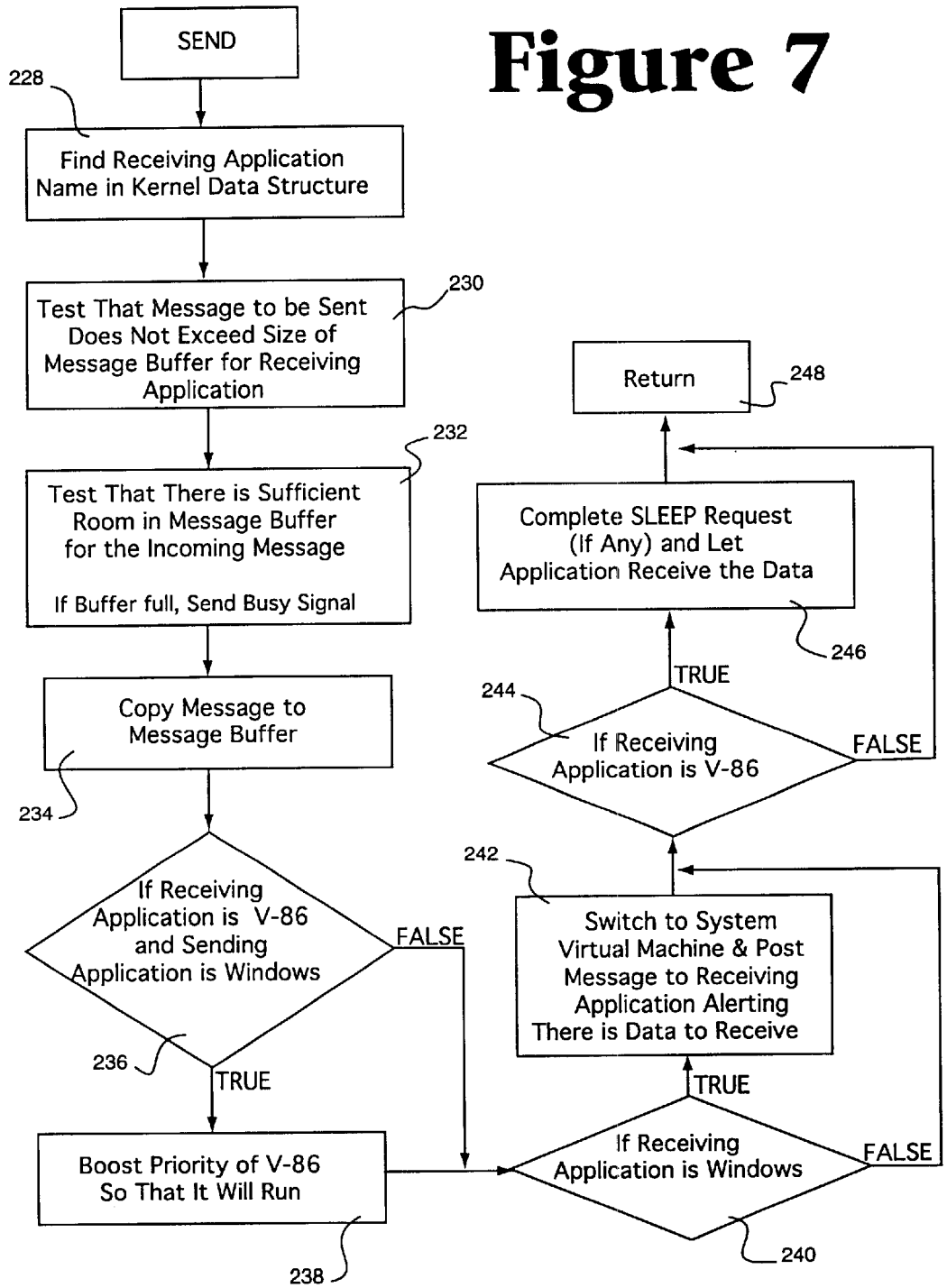
FIG. 7 is a flowchart diagram of the Send routine.

The SEND command is shown in the flowchart of FIG. 7. The SEND function first locates the record of the receiving application from the kernel data structure by performing a text search upon the receiving application's name (Step 228). If an entry for the receiving application is not found in the data structure, an error message is sent and the send routine returns. Next, at Step 230, the message to be send is tested to ensure that it does not exceed the size of the message buffer of the receiving application. This is done by comparing the length of the message to be sent with the recorded size of the message buffer maintained as one of the records in the kernel data structure 112. If the message will not fit within the message buffer, an error message is generated and the SEND routine returns. Assuming the buffer size has not been exceeded, the routine next tests (at Step 232) whether there is sufficient room in the message buffer for the incoming message). In this regard, the message buffer may already contain data waiting to be accessed, hence the entire message buffer may not be available for storing the message to be sent. If the message buffer will not hold the incoming message, a "Buffer Full" busy signal is sent (Step 232), allowing the sending application to try again later.

Having determined that the message buffer is adequate to hold the message to be sent, the message is then copied into the message buffer at Step 234. Next, a series of decisions are performed to properly notify the receiving application that there is data waiting or it to receive. The technique for accomplishing this depends on the addressing mode of the receiving application. Steps 236 through 246 handle these details.

Specifically, if the receiving application is a virtual-86 application, and if the sending application is a WINDOWS application, the priority of the virtual-86 application is boosted so that it will run . T his is tested for and handled in Steps 236 and 238. If the receiving application is a WINDOWS application, a message is posted to the receiving application to alert it that there is data to receive. This is done by switching to the system virtual machine. These steps are illustrated at Steps 240 and 242. Finally, if the receiving application is a virtual-86 mode application, the procedure detects this and allows any SLEEP request previously sent to be completed, allowing the application to receive data. This is illustrated in Steps 244 and 246. After the application has been notified that there is data to receive, the routine returns at Step 248.

The SLEEP request, more fully described below, allows a message to be sent to a virtual-86 DOS application, without requiring the DOS application to run continuously, while polling for messages sent to it. While a polling technique could be used, the running DOS application would consume processor cycles that could otherwise be used elsewhere. The SLEEP request allows the DOS application to sleep (consuming no unnecessary processor cycles) until awakened or interrupted to receive the message.

Figure 8:
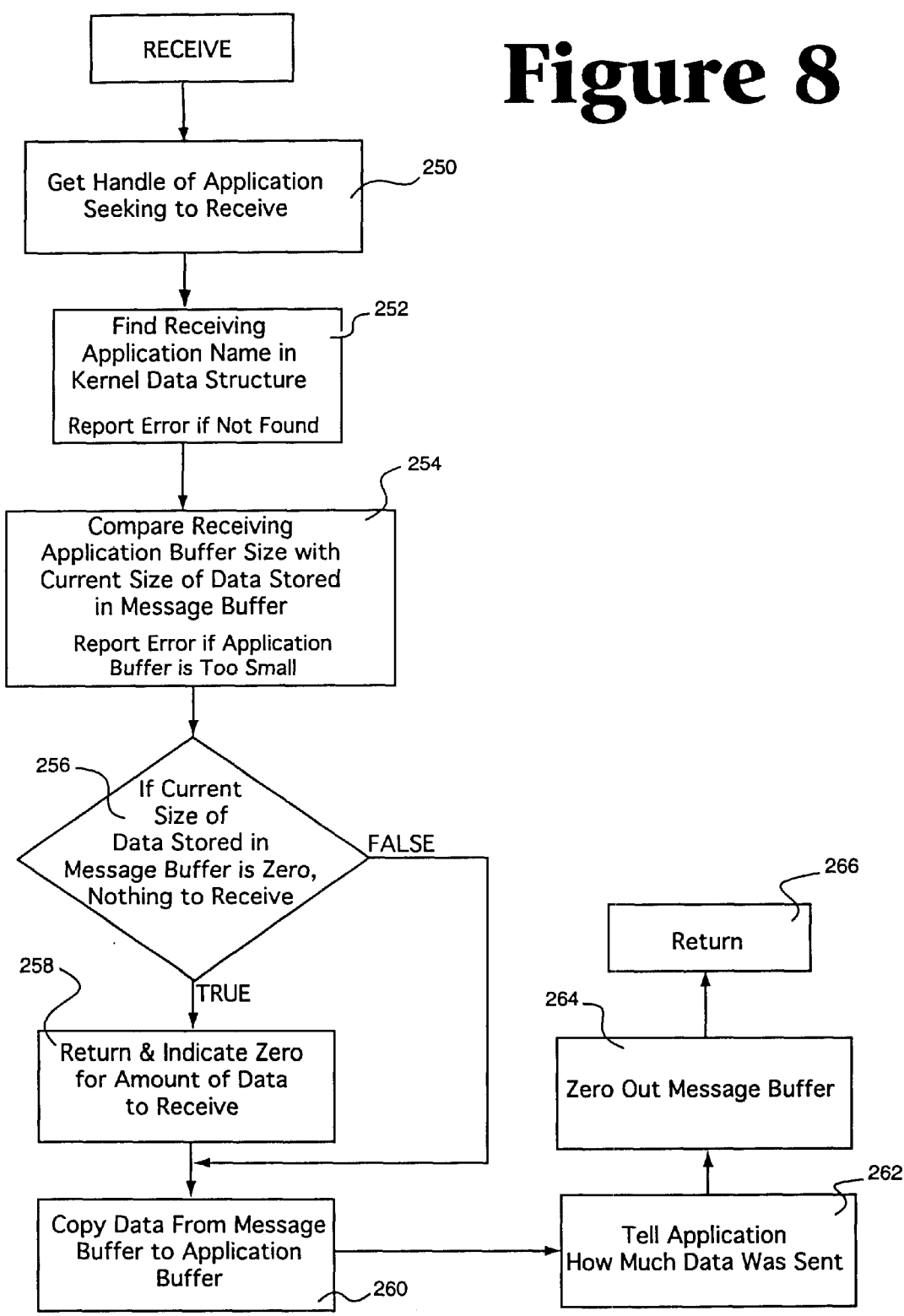
FIG. 8 is a flowchart diagram of the Receive routine.

The RECEIVE routine complements the SEND routine, taking up where the SEND routine left off to pass a copy of the data in the message buffer to the application buffer of the receiving application. This routine is illustrated in FIG. 8. It begins at Step 250 by getting the handle of the application seeking to receive information. The routine searches through the linked list records of the kernel data structure to locate the application by name (Step 252). If the application name is not found, an error is reported and the routine returns. Next, the buffer size of the receiving application is compared with the current size of the data stored in the kernel message buffer (Step 254). If the application buffer is too small to contain the message stored in the message buffer, an error is reported and the routine returns. If the current size of the data stored in the message buffer is zero, there is nothing to receive and the routine simply returns with an indication that there is zero bytes of data to receive. This is shown at Steps 256 and 258.

After the preceding tests are performed, the data stored in the message buffer is copied to the application buffer at Step 260 and a message is returned to the application, telling it how much data was sent (Step 262). The data having been transferred from the message buffer to the application buffer, the message buffer is then zeroed out (returned to an empty state) at Step 264 and the routine returns at Step 266.

The SLEEP routine is shown in FIG. 9. As previously noted, the SLEEP routine allows messages to be sent to virtual-86 DOS applications, without requiring those applications to constantly run, polling for messages. The SLEEP routine implements a more efficient messaging technique, where a DOS application is suspended until there is a message for it.

The SLEEP routine begins by getting the handle of the application seeking to declare a sleep condition and checking to see that the application is registered (Step 268). If the application is not registered, an error message is generated and the routine returns. If the application is currently running in the operating system's virtual machine (called the "system virtual machine"), then the SLEEP request is rejected at Step 270. This prevents the application from locking up the system virtual machine in which all WINDOWS applications coexist. Next, in Step 272, if the priority of the application has been boosted while registered, this condition is detected and the priority of the application is lowered at Step 274. This enhances system performance and efficiency.

Following the preceding housekeeping steps, the SLEEP event is scheduled at Step 276. The SLEEP event may be scheduled to place the DOS application in suspension for a predetermined number of milliseconds (specified as an argument to the SLEEP function call) or for an indefinite time-until awakened by a message for that application. After placing the application in a suspended "sleep" condition, the routine returns at Step 278.

The universal communication mechanism of the invention has many uses in solving communications problems between dissimilar applications running in an operating system environment. In this regard, the invention may be used to facilitate communication between the application components of a key management system used to implement Internet traffic security. The Applicants' assignee has developed a packet-oriented key distribution system known as the Simple Key management for Internet Protocol (SKIP) system that greatly simplifies one of the most difficult problems in Internet security, namely how to establish and change traffic encryption keys.

The SKIP system utilizes the fact that if each principal (IP node) in a network has a certified public key, then each principal shares a mutually authenticated key which is computable, based solely on knowledge of the other principal's certificate. Whereas the public key is distributed in the form of a public key certificate, the two communicating principals share a mutually authenticated secret that is not communicated explicitly to either principal. Each principal then computes the secret, based on knowledge of the other principal's identity and the public key certificate. The shared secret may be computed using the Diffie-Hellman algorithm, for example. For information on the Diffie-Hellman algorithm see W. Diffie and M. Hellman, "New Directions in Cryptography," *IEEE Trans. Info. Theory*, IT-22, pp. 644–654, 1976.

According to the SKIP technique, individual IP packets are encrypted (or authenticated) using a randomly generated packet key. The packet key is in turn encrypted. The process used to encrypt the packet key can be cached for efficiency, allowing traffic keys (i.e., packet keys) to be modified very rapidly, even on a per packet basis, if required. This greatly reduces the computational overhead of conventional public key operation. Furthermore, because the keys are communicated in packets themselves, there is no need to incur the overhead and complexity of a pseudo-session layer underneath the IP layer.

Implementing the SKIP key management system on a MICROSOFT WINDOWS platform typically involves several different applications, including a key manager and a configuration program, that need to communicate with one another.

The key manager of the SKIP system runs a synchronously in background and that presents a difficulty. MICROSOFT WINDOWS provides a "cooperative" multitasking environment, in which a WINDOWS application may run until it relinquishes control to another WINDOWS application. Thus a running WINDOWS application could prevent the key manager from running when needed.

The universal communication mechanism of the invention solves the problem, by allowing the key manager to be implemented as a virtual-86 DOS application. Virtual-86 DOS applications run in separate virtual machines and they are scheduled separately from WINDOWS applications. Thus a virtual-86 DOS key manager can run a synchronously in background, without being preempted by a concurrently running WINDOWS application.

Given the diversity of addressing modes supported by the MICROSOFT WINDOWS environment, the universal communication mechanism offers an effective solution to make the SKIP key management system work. The key manager may be implemented as a virtual-86 DOS application without limiting the other portions of the system from being implemented as other virtual-86 DOS applications, 16 bit WINDOWS applications and 32 bit WINDOWS applications, depending on the particular system requirements. These application components can readily communicate with one another through the API function call services of the universal communication mechanism of the invention.

While the invention has been described in its presently preferred form, it will be understood that certain modifications can be made to the preceding without departing from the spirit of the invention as set forth in the appended claims.

APPENDIX

Map Flat Pseudocode get current virtual machine handle
get upper 16 bits of address from address passed in (in S)

APPENDIX-continued

```
get lower 16 bits of address (in variable Offset)
if current virtual machine is not the system VM and
if the caller is running in virtual-86 mode
        then flat address = S * 16 + Offset + high linear address for that
current VM
else
        get descriptor for the code selector of the caller
        if this is a BIG segment
                then this is a 32-bit caller
                get the caller's data selector
                get descriptor for the data selector
                flat address = offset + 32-bit descriptor base address
        else
                get descriptor for S
                flat address = offset + 32-bit descriptor base address
Preferred Data Structure struct kernhandle {
        struct kernhandle *next;         /* pointer to next in list */
        unsigned char name[16];          /* app name for displaying to user */
        unsigned short      postmsg_o;   /* address of windows postmessage() */
        unsigned short      postmsg_s;
        unsigned short      hwnd;        /* win handle for the application */
        unsigned short      msg2post;    /* message number for postmessage() */
        unsigned long bufsize;           /* app's buffer size */
        unsigned long  cursize;          /* amount of data in use in buffer */
        char          *msgbuf;           /* pointer to our message buffer */
        unsigned long hmsgbuf;           /* msgbuf memory handle */;
        unsigned long numlost;           /* num lost messages due to overflow */
        VMHANDLE vm;                     /* VM in which app runs */
        unsigned long status;            /* mode (V86, PM16, PM32) app runs */
        unsigned long sleepsem;          /* semaphore handle */
        unsigned long prio_boosted;      /* flag to indicate we've boosted prio*/
};
```

What is claimed is:

1. A communication mechanism for passing information within an operating system environment between computer-implemented applications running in said environment that employ different memory addressing modes, comprising:

a device driver coupled to said operating system environment and having application program interface to communicate with said applications through a set of predefined function calls;

said device driver having a message handler responsive to said function calls and a message buffer to establish buffered communication between at least two of said applications, one application being a sending application and one application being a receiving application, the sending application issuing predetermined information intended for the receiving application;

a mapping mechanism coupled to said message handler configured to determine the addressing mode of said sending application and to translate the addressing mode of said sending application into a predetermined addressing mode;

a message transfer mechanism coupled to said message handler that uses said mapping mechanism to copy said predetermined information into said message buffer and then to signal said receiving application to access said message buffer to copy said predetermined information, whereby a copy of said predetermined information is passed between sending application and receiving application without requiring the receiving application to know the addressing mode of the sending application whereby the sending application is adapted to operate a synchronously of the receiving application.

2. The communication mechanism of claim 1 wherein said operating system environment supports a first virtual machine for execution of application programs of a first addressing mode and a second virtual machine for execution of application programs of a second addressing mode and wherein said device driver establishes buffered communication between a first application program running in said first virtual machine and a second application program running in said second virtual machine.

3. The communication mechanism of claim 2 wherein said first virtual machine is a Windows virtual machine.

4. The communication mechanism of claim 2 wherein said second virtual machine is a DOS virtual-86 virtual machine.

5. The communication mechanism of claim 1 wherein said device driver establishes buffered communication among a plurality of applications and wherein said device driver allocates a message buffer for each of said plurality of applications.

6. The communication mechanism of claim 1 wherein said message handler is responsive to a REGISTER function call by a first application seeking to establish buffered communication and wherein said message handler allocates a first message buffer for said first application in response to said REGISTER function call.

7. The communication mechanism of claim 1 wherein said message handler is responsive to a DEREGISTER function call by a first application seeking to terminate buffered communication, said first application having an associated first message buffer and wherein said message handler deallocates said first message buffer in response to said DEREGISTER function call.

8. The communication mechanism of claim 1 wherein said message handler is responsive to a SEND function call by said sending application and wherein said message handler in response to said SEND function call places said predetermined information in said message buffer and posts a message to said receiving application to signal said receiving application to access said message buffer.

9. The communication mechanism of claim 1 wherein said receiving application has a predetermined application buffer, wherein said message handler is responsive to a RECEIVE function call by said receiving application and wherein said message handler in response to said RECEIVE function call accesses said message buffer and copies said predetermined information into said application buffer.

10. The communication mechanism of claim 1 wherein said message handler is responsive to a SLEEP function call by a first application, and wherein said message handler causes said first application to suspend its further operation until buffered communication is established between said first application and said sending application, with said first application serving as said receiving application.

11. The communication mechanism of claim 1 further comprising a data store administered by said device driver, said data store being configured according to a predetermined data structure that includes memory allocation to store the addressing modes of said sending and receiving applications.

12. The communication mechanism of claim 1 further comprising a data store administered by said device driver, said data store being configured as a linked list having respective entries in the list corresponding to said sending and receiving applications.

13. The communication mechanism of claim 1 further comprising a data store administered by said device driver, said data store being configured according to a predetermined data structure that includes memory allocation to store the priority boosted operating status of said sending and receiving applications.

14. The communication mechanism of claim 1 further comprising a data store administered by said device driver, said data store being configured according to a predetermined data structure that includes memory allocation to store predetermined data used to signal said receiving application to access said message buffer.

15. The communication mechanism of claim 1 further comprising a data store administered by said device driver, said data store being configured according to a predetermined data structure to define said message buffer.

16. An article of manufacture for use in a computer system having an operating system environment of the type that supports computer-implemented applications employing different memory addressing modes comprising:
   a computer usable delivery medium having a device driver configured for coupling to said operating system environment, said device driver having application program interface configured to provide communication with said applications through a set of predefined function calls;
   said device driver having a message handler configured to respond to said function calls and having program code to define a message buffer to support buffered communication between at least two applications;
   said device driver having a mapping mechanism interfacing with said message handler and configured to determine the addressing mode of said applications and to translate said addressing modes into a predetermined addressing mode; and
   said device driver having a message transfer mechanism interfacing with said message handler and having program code configured to copy information from at least a first one of said applications into said message buffer and then to signal at least a second one of said applications to access said message buffer to acquire said information, whereby said first application is adapted to operate asynchronously of said second application.

17. The article of manufacture according to claim 16 wherein said operating system environment supports a first virtual machine for execution of application programs of a first addressing mode and a second virtual machine for execution of application programs of a second addressing mode and wherein said device driver is configured to establish buffered communication between a first application program running in said first virtual machine and a second application program running in said second virtual machine.

18. The article of manufacture according to claim 17 wherein said first virtual machine is a Windows virtual machine.

19. The article of manufacture according to claim 17 wherein said second virtual machine is a DOS virtual-86 virtual machine.

20. The article of manufacture according to claim 16 wherein said device driver is configured to establish buffered communication among a plurality of applications and wherein said device driver is configured to allocate a message buffer for each of said plurality of applications.

21. The article of manufacture according to claim 16 wherein said message handler includes program code to respond to a REGISTER function call by a first application seeking to establish buffered communication and wherein said message handler is configured to allocate a first message buffer for said first application in response to said REGISTER function call.

22. The article of manufacture according to claim 16 wherein said message handler includes program code to respond to a DEREGISTER function call by a first application seeking to terminate buffered communication and wherein said message handler is configured to deallocate a message buffer associated with said first application in response to said DEREGISTER function call.

23. The article of manufacture according to claim 16 wherein said message handler includes program code to respond to a SEND function call by a first application and wherein said message handler is configured to respond to said SEND function call by placing information from said first application in said message buffer and posting a message to a second application to signal said second application to access said message buffer.

24. The article of manufacture according to claim 16 wherein said message handler includes program code to respond to a RECEIVE function call by a first application and wherein said message handler is configured to respond to said RECEIVE function call by accessing said message buffer and copying information to said application.

25. The article of manufacture according to claim 16 wherein said message handler includes program code to respond to a SLEEP function call by a first application, and wherein said message handler is configured to respond to said SLEEP function call to suspend operation of said first application until buffered communication is established between said first application and a second application.

26. The article of manufacture according to claim 16 further comprising program code to establish a data store administered by said device driver, said data store being configured according to a predetermined data structure that includes memory allocation to store the addressing modes of said sending and receiving applications.

27. The article of manufacture according to claim 16 further comprising program code to establish a data store administered by said device driver, said data store being configured as a linked list having respective entries in the list corresponding to said sending and receiving applications.

28. The article of manufacture according to claim 16 further comprising program code to establish a data store administered by said device driver, said data store being configured according to a predetermined data structure that includes memory allocation to store the priority boosted operating status of said sending and receiving applications.

29. The article of manufacture according to claim 16 further comprising program code to establish a data store administered by said device driver, said data store being configured according to a predetermined data structure that includes memory allocation to store predetermined data used to signal said receiving application to access said message buffer.

30. The article of manufacture according to claim 16 further comprising program code to establish a data store administered by said device driver, said data store being configured according to a predetermined data structure to define said message buffer.

31. A method of conducting communication within an operating system environment between computer-implemented applications running in said environment that employ different memory addressing modes, comprising:
    providing a device driver coupled to said operating system environment and having application program interface to communicate with said applications through a set of predefined function calls;
    in response to a first function call: establishing a message buffer in said device driver to support buffered communication between at least two of said applications, one application being a sending application and one application being a receiving application, the sending application having predetermined information intended for the receiving application and whereby said sending application is adapted to operate asynchronously of said receiving application;
    determining the addressing mode of said sending application and translating the addressing mode of the sending application into a predetermined addressing mode;
    in response to a second function call by said sending application: copying said predetermined information from said sending application into said message buffer and signaling said receiving application; and
    in response to a third function call by said receiving application: copying said predetermined information from said message buffer to said receiving application.

32. The method of claim 31 wherein said operating system environment supports a first virtual machine for executing applications of a first addressing mode and a second virtual machine for executing applications of a second addressing mode and wherein said device driver establishes buffered communication between a first application running in said first virtual machine and a second application running in said second virtual machine.

33. The method of claim 32 wherein said first virtual machine is a Windows virtual machine.

34. The method of claim 32 wherein said second virtual machine is a DOS virtual-86 virtual machine.

35. The method of claim 31 further comprising allocating a message buffer for each of a plurality of applications.

36. The method of claim 31 wherein first function call is a REGISTER function call by a first application seeking to establish buffered communication and wherein said step of establishing a message buffer includes establishing a first message buffer for said first application in response to said REGISTER function call.

37. The method of claim 31 further comprising responding to a DEREGISTER function call by a first application seeking to terminate buffered communication, said first application having an associated first message buffer and wherein said step of responding to said DEREGISTER function call is performed by deallocating said first message buffer.

38. The method of claim 31 wherein second function call is a SEND function call by said sending application and wherein said step of signaling said receiving application is performed by posting a message to said receiving application to signal said receiving application to access said message buffer.

39. The method of claim 31 wherein said receiving application has a predetermined application buffer, wherein said third function call is a RECEIVE function call by said receiving application and wherein said step of copying said predetermined information to said sending application is performed by copying said predetermined information into said application buffer.

40. The method of claim 31 further comprising responding to a SLEEP function call by a first application by suspending operation of said first application until buffered communication is established between said first application and said sending application, with said first application serving as said receiving application.

41. The method of claim 31 further comprising allocating a data store administered by said device driver, said data store being configured according to a predetermined data structure that includes memory allocation to store the addressing modes of said sending and receiving applications.

42. The method of claim 31 further comprising allocating a data store administered by said device driver, said data store being configured as a linked list having respective entries in the list corresponding to said sending and receiving applications.

43. The method of claim 31 further comprising allocating a data store administered by said device driver, said data store being configured according to a predetermined data structure that includes memory allocation to store the priority boosted operating status of said sending and receiving applications.

44. The method of claim 31 further comprising allocating a data store administered by said device driver, said data store being configured according to a predetermined data structure that includes memory allocation to store predetermined data used to signal said receiving application to access said message buffer.

45. The method of claim 31 further comprising allocating a data store administered by said device driver, said data store being configured according to a predetermined data structure to define said message buffer.

* * * * *